United States Patent [19]
Wolk

[11] 3,858,651
[45] Jan. 7, 1975

[54] WELL INSTRUMENT POSITIONING DEVICE

[75] Inventor: Piero Wolk, Houston, Tex.

[73] Assignee: Dresser Industries, Inc., Dallas, Tex.

[22] Filed: Dec. 19, 1973

[21] Appl. No.: 426,147

[52] U.S. Cl................. 166/241, 166/100, 175/4.52
[51] Int. Cl............................................. E21b 17/10
[58] Field of Search............ 175/4.52, 4.6; 166/100, 166/172, 173, 241; 33/178 F; 324/10; 73/151

[56] References Cited
UNITED STATES PATENTS

| | | | |
|---|---|---|---|
| 1,293,777 | 2/1919 | Hogue............................ | 166/172 X |
| 1,400,951 | 12/1921 | Goodfellow..................... | 33/178 F |
| 1,898,074 | 2/1933 | Bailey............................ | 166/241 X |
| 2,694,791 | 11/1954 | Schlumberger.................. | 324/10 X |
| 2,945,540 | 7/1960 | Alexander et al................. | 166/173 |
| 3,092,182 | 6/1963 | Blagg............................. | 33/178 F X |
| 3,114,422 | 12/1963 | Solum et al..................... | 166/241 X |
| 3,366,188 | 1/1968 | Hicks............................. | 175/4.52 X |
| 3,448,373 | 6/1969 | Hahn.............................. | 166/241 X |
| 3,555,689 | 1/1971 | Cubberly........................ | 166/241 X |
| 3,707,195 | 12/1972 | Lanmon......................... | 166/100 X |

*Primary Examiner*—David H. Brown
*Attorney, Agent, or Firm*—William E. Johnson, Jr.

[57] ABSTRACT

One or more helical torsion springs have arms mounted on their opposite ends which are slideably connected within a groove formed between a U-shaped member and a well instrument such that the spring forces the well instrument into contact with the cased side-wall of an earth borehole. As the instrument traverses tubing or casing having a greater internal diameter, a greater force is exerted to place the instrument against the sidewall.

7 Claims, 6 Drawing Figures

WELL INSTRUMENT POSITIONING DEVICE

BACKGROUND OF THE INVENTION

The present invention relates generally to the art of petroleum exploration and production and, more particularly, to an apparatus for positioning a well instrument in a well.

Many well instruments must be properly oriented in a well before being actuated to perform the desired operation in the well. For example, a perforating apparatus such as that shown in U.S. Pat. No. 3,589,453 to A. A. Venghiattis, patented June 29, 1971, operates best if the instrument is centered in the well. On the other hand, a perforating apparatus such as that shown in U.S. Pat. No. 3,620,314 to F. O. Bohn, patented Nov. 16, 1971, operates more efficiently if it is positioned against one wall of the well. Logging instruments such as the logging instrument shown in U.S. Pat. No. 3,321,627 to C. W. Tittle, patented May 23, 1967, also require proper orientation in the well during the logging operation.

It is also well known in the art to use a bow spring decentralizer, for example, as exemplified by U.S. Pat. No. 3,233,105 to A. H. Youmans.

Another such decentralizer means is shown in my U.S. Pat. No. 3,762,473.

To the best of my knowledge, all of the prior art devices have one common trait; they all employ devices which push against one or more of the sidewalls of the well with a decreasing force as the diameter of the well increases. This is best exemplified by the bow spring type of device which is well known in the art. With such a device, there is practically no outward force exerted on the sidewall when used in a well having a casing with an internal diameter approximately matching the extreme relaxed dimensions of the tool.

It is therefore the primary object of the present invention to provide a new and improved well positioning device;

it is another object of the present invention to provide a new and improved well positioning device having improved outward force characteristics;

It is still another object of the present invention to provide a new and improved well positioning device whose outward force characteristics increase in response to the well instrument being utilized in greater diameter wells within a given range.

The objects of the invention are accomplished, generally, by an apparatus which utilizes a helical torsion spring for contacting one wall of the well wherein at least one of the arms attached to opposite ends of the spring is slideably attached to the well instrument.

These and other objects, features and advantages of the present invention will be more readily appreciated from a reading of the following detailed specification and drawing, in which.

Figure 1:
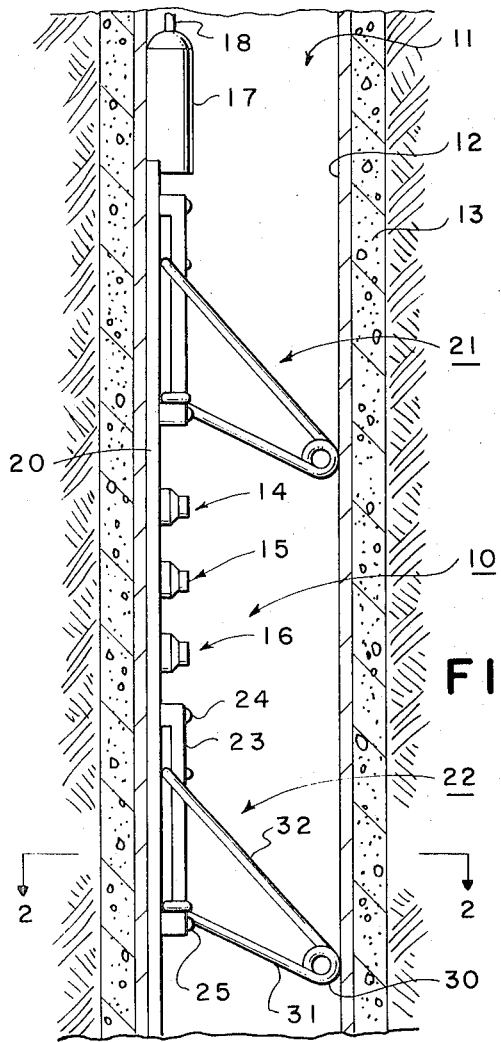
FIG. 1 is an elevated view, partly in cross section, of a well instrument which is positioned within a well in accordance with the invention.

Referring now to the drawing in more detail, especially to FIG. 1, there is illustrated a well instrument generally designated by the reference numeral 10 which is positioned within a well 11. The well 11 may be cased as with the casing 12 held in place within the earth borehole by the cement 13. Within the embodiment illustrated in FIG. 1, the well instrument 10 is a perforating gun having a plurality of perforators 14, 15 and 16 as is well known in the art. The perforators are adapted to be selectively fired through the casing 12. It is to be understood that other operating units such as a sidewall sampling unit similar to that shown in U.S. Pat. No. 3,272,268 to A. J. Tricon et al., patented Sept. 13, 1969, could be used in place of the perforating units. It will be appreciated also that this type of operating unit is preferably positioned against one wall of the well during the operating cycle. The control unit 17 enables the perforators to be fired in a manner as selected by electrical signals coming over the hoist cable 18, all of which is conventional in the art.

The instrument 10 includes an elongated mandrel 20 upon which the perforators are mounted. Also mounted on the mandrel 20 are a pair of positioning devices generally designated by the reference numerals 21 and 22. Since the devices 21 and 22 are substantially identical, only the positioning device 22 will be described hereinafter in detail. The positioning device 22 comprises a U-shaped member 23 having its arms attached to the mandrel 20 by means of bolts 24 and 25. A helical torsion spring 30, shown in greater detail in FIG.'s 2, 5 and 6, and having arms 31 and 32 attached to its opposite ends is attached to the U-shaped member 23 such that the ends of the arms 31 and 32 are slideably connected and arranged to slide through the groove formed between the mandrel 20 and the U-shaped member 23. This feature is best illustrated in FIG. 2.

Figure 2:
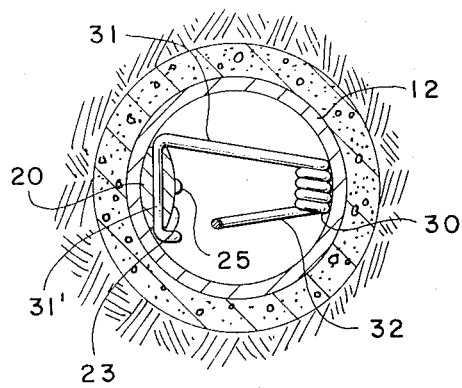
FIG. 2 is a cross-sectional plan view taken along the section lines 2—2 of FIG. 1.

Referring now to FIG. 2, there is illustrated a top plan view taken along the cross-section lines 2-2 of FIG. 1. It should be appreciated that the helical torsion spring 30 rides against the casing 12 and that the L-shaped end 31' of the spring arm 31 is arranged to slide between the mandrel 20 and the U-shaped member 23 which is bolted onto the mandrel 20 by means of the bolt 25.

Figure 3:
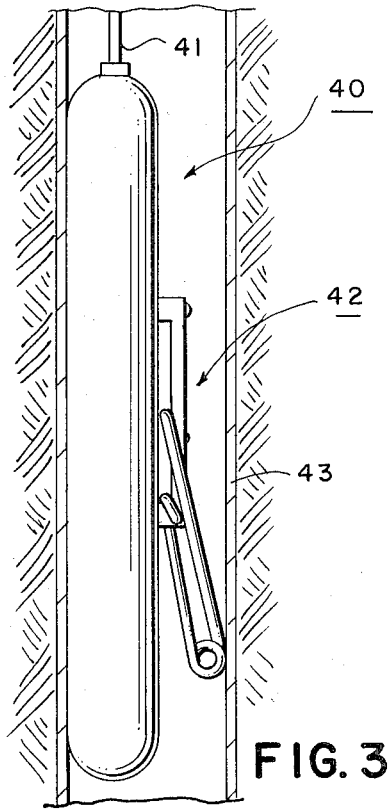
FIG. 3 is an elevated view, partly in cross section, of a well instrument positioned in accordance with the present invention within a well having a given diameter.

Referring now to FIG. 3, there is illustrated an alternative well instrument, shown generally by the numeral 40. The instrument 40 could be any of the instruments well known in the art, for example, an acoustic or electrical well logging tool or could be a sidewall sampler or any other such device known for logging, perforating, sampling or otherwise performing operations within a well. The instrument 40 is suspended within the well by a hoist cable 41 having the necessary electrical conductors for performing the chosen well operation. The instrument 40 has attached thereto a single well positioning device 42 which is substantially identical to the devices 21 and 22 of FIG. 1 and need not be explained in any further detail. Suffice it to say at this point that the instrument 40 is located within a cased earth borehole having casing 43 of a given internal diameter, for example, five inches.

Figure 4:
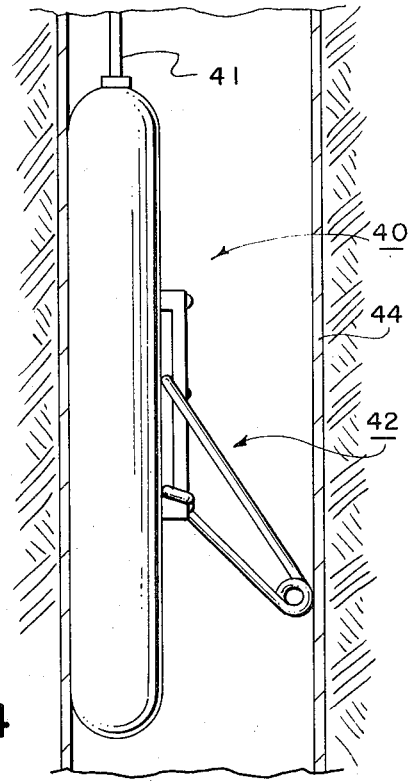
FIG. 4 is an elevated view, partly in cross section, illustrating the apparatus according to FIG. 3 but within a well having an increased diameter.

Referring now to FIG. 4, the same instrument 40 as was illustrated in FIG. 3 is located within a cased borehole having casing 44 of a greater internal diameter than the casing 43 of FIG. 3, for example, 7 inches. It should be appreciated that the arms of the spring for the positioning device as is illustrated in FIG. 4 have slid further apart due to the increase in diameter of the casing as compared to that of FIG. 3. Thus, in the operation of the devices of FIG.'s 3 and 4, as the well instrument 40 traverses the cased borehole, the instrument 40 is continually urged against one sidewall of the borehole by the action of the positioning device 42 which maintains the helical torsion coil against the other sidewall of the borehole.

Figures 5, 6:
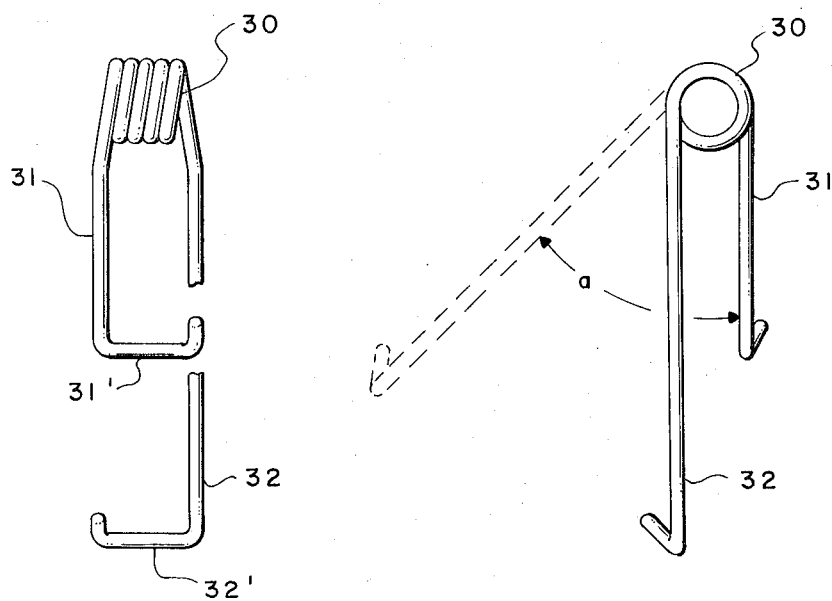
FIG. 5 is a pictorial view of a helical torsion spring which is used in accordance with the present invention.
FIG. 6 is a side view of the spring according to FIG. 5 illustrating the desired angular relationship of the arms of the spring in accordance with the present invention.

Referring now to FIG. 5, there is illustrated in greater detail the helical torsion spring 30 of FIG. 1. The arms 31 and 32 attached to opposite ends of the spring 30 each has an L-shaped outer extremity 31' and 32', respectively, which are adapted to slide within the groove formed between the mandrel 20 and the U-shaped member 23 of FIG. 1.

Referring now to FIG. 6, the spring 30 is shown in a side view wherein the arms 31 and 32 are separated by an angle in the preferred embodiment of approximately 42° to 45° in the relaxed or free position. This angle $\alpha$ decreases between the arms 31 and 32 as the well instrument is moved into a smaller diameter casing or well tubing. As previously mentioned, as the arms 31 and 32 are opened toward the relaxed position when entering larger casing, the leverage increases because of the arms opening, thus causing the coil 30 to be pushed harder against the sidewall. Conversely, as the arms are pushed closer together because of entering smaller diameter casing or tubing, the leverage factor decreases and the coil 30 is pushed with a lesser force against the wall of the casing or tubing.

Thus it should be appreciated that the preferred embodiments of the present invention have been described herein wherein new and improved means are provided for urging a well instrument against one of the sidewalls of a cased earth borehole or against one of the internal walls of a string of well tubing. Obvious modification will occur to those skilled in the art from a reading of the foregoing detailed description. For example, three or more of the well positioning devices described herein could be used on a single instrument. Likewise, by arranging two or more such devices on opposite sides of the instrument, the instrument can be centered within the borehole instead of being urged against one of the sidewalls. In a similar vein, instead of having both arms on the opposite ends of the spring free to slide within the groove between the U-shaped member and the mandrel, one arm could be fixedly attached while having one arm free to slide. It should also be appreciated that when using the term helical torsion spring, those skilled in the art will recognize that any number of turns in the coil of the spring can be used, for example, one, and that the number of turns as is illustrated in FIG.'s 2 and 5 is not to be construed in a limiting sense.

Furthermore, while FIG. 1 contemplates the use of a separate groove housing for each of the two springs, the invention also contemplates the use of two or more springs having arms slideably moveable within a single groove.

The embodiments of the invention in which an exclusive property or privilege is claimed are defined as follows:

1. An apparatus for positioning a well instrument in a well, comprising:
   a U-shaped member mounted on said well instrument, said member and said instrument defining an elongated groove; and
   a helical torsion spring having first and second arms attached to the opposite ends of said spring, respectively, said arms each having an L-shaped outer extremity, each of said L-shaped extremities being slideably moveable within said groove.

2. An apparatus for positioning a well instrument in a well, comprising:
   a housing mounted on said instrument defining an elongated groove; and
   a helical torsion spring having first and second arms attached to the opposite ends of said spring, respectively, said arms each having an L-shaped outer extremity, each of said L-shaped extremities being slideably moveable within said groove.

3. A well instrument, comprising:
   an elongated housing adapted to traverse an earth borehole, said housing having a groove along at least a portion of its length; and
   a helical torsion spring having first and second arms attached to the opposite ends of said spring, respectively, said arms each having an L-shaped outer extremity, each of said L-shaped extremities being slideably moveable within said groove.

4. An apparatus for positioning a well instrument in a well, comprising:
   a U-shaped member mounted on said well instrument, said member and said instrument defining an elongated groove; and
   a helical torsion spring having first and second arms attached to the opposite ends of said spring, respectively, at least one of said arms having an L-shaped extremity which is slideably moveable within said groove.

5. An apparatus for positioning a well instrument in a well, comprising:
   a housing mounted on said instrument defining an elongated groove; and
   a helical torsion spring having first and second arms attached to the opposite ends of said spring, respectively, at least one of said arms having an L-shaped extremity which is slideably moveable within said groove.

6. A well instrument, comprising:
   an elongated housing adapted to traverse an earth borehole, said housing having a groove along at least a portion of its length; and
   a helical torsion spring having first and second arms attached to the opposite ends of said spring, respectively, at least one of said arms having an L-shaped extremity which is slideably moveable within said groove.

7. Apparatus for positioning a well instrument in a well, comprising:
   a first housing mounted on said instrument defining a first elongated groove;

a first helical torsion spring having first and second arms attached to the opposite ends of said first spring, respectively, at least one of said arms attached to said first spring having an extremity which is slideably moveable within said first groove;

a second housing mounted on said instrument defining a second elongated groove; and a second helical torsion spring having first and second arms attached to the opposite ends of said second spring, respectively, at least one of said arms attached to said second spring having an extremity which is slideably moveable within said second groove.

* * * * *